Figure 1:
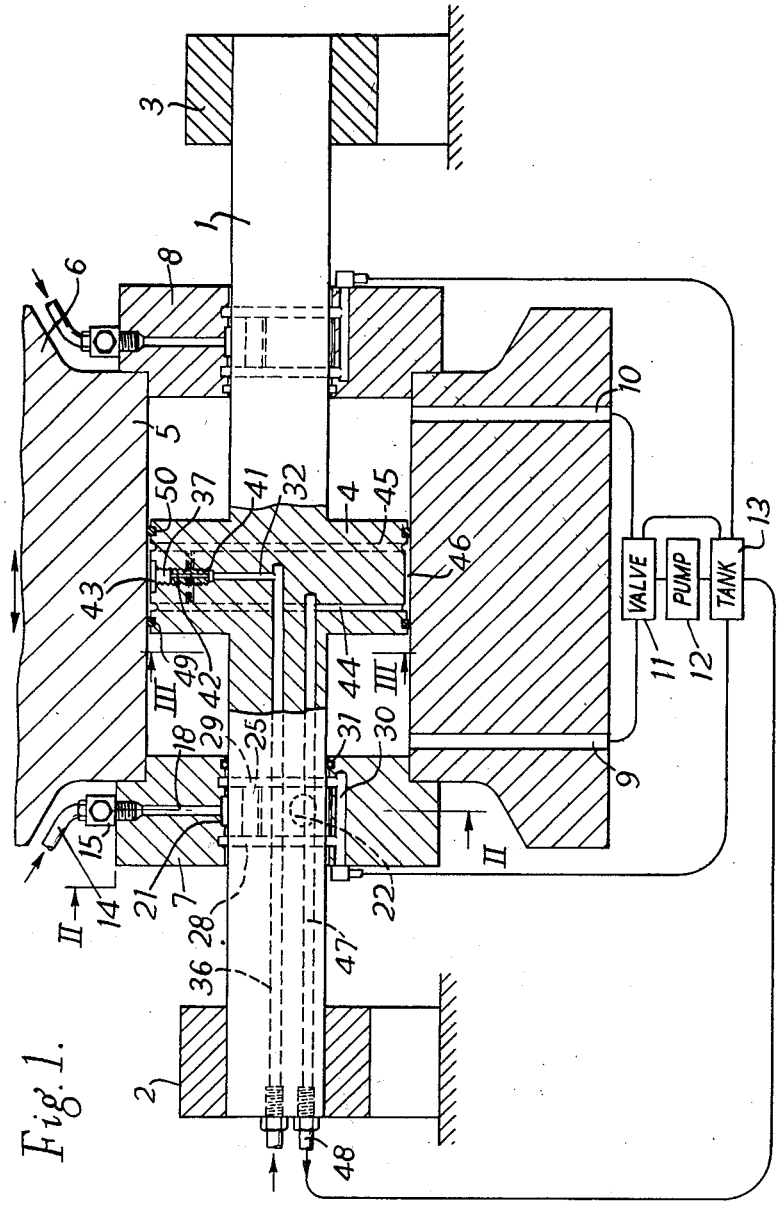

Feb. 2, 1965     D. T. N. WILLIAMSON     3,168,013
HYDRAULIC SYSTEMS
Filed April 11, 1963     2 Sheets-Sheet 2
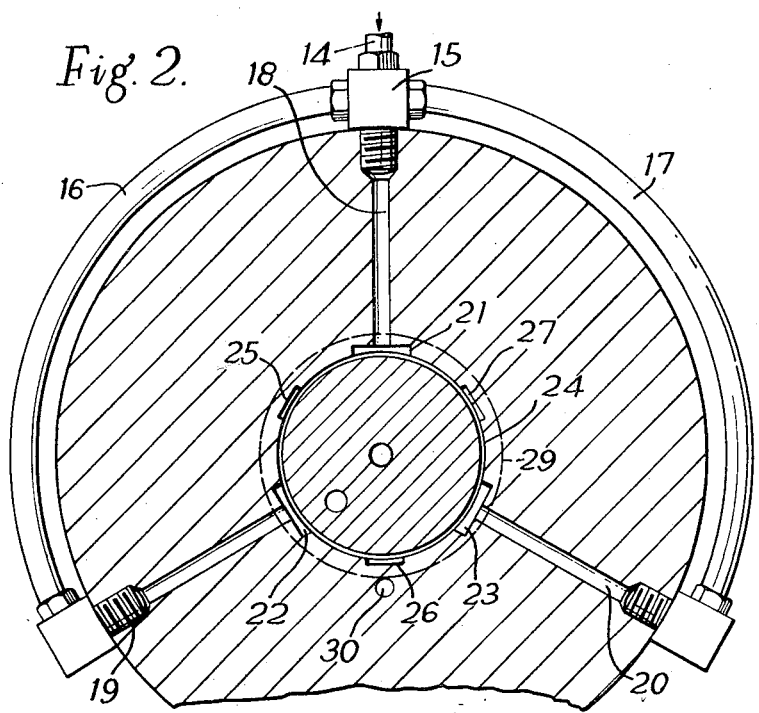
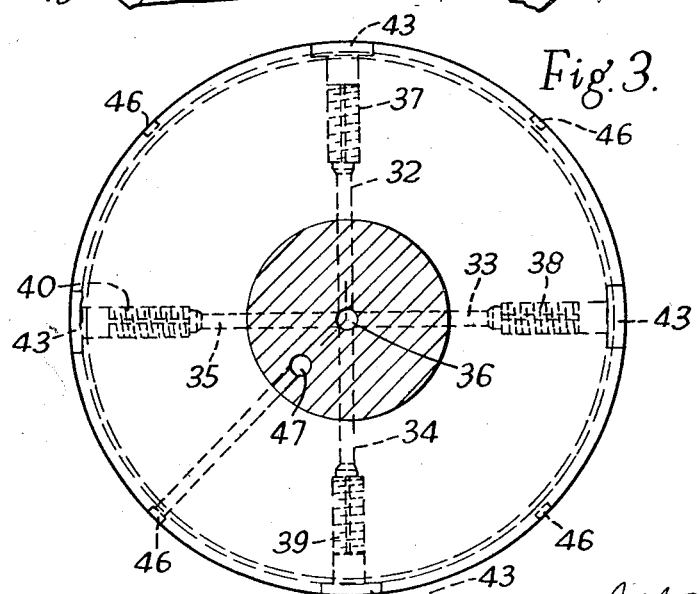
INVENTOR
David T. N. Williamson
BY
Watson, Cole, Grindle & Watson
ATTORNEY 3,168,013
HYDRAULIC SYSTEMS
David Theodore Nelson Williamson, Deptford, London, England, assignor to Molins Machine Company Limited, London, England, a British company
Filed Apr. 11, 1963, Ser. No. 272,287
Claims priority, application Great Britain, Apr. 19, 1962, 15,314
4 Claims. (Cl. 92—112)

This invention concerns improvements in hydraulic actuators for machine tool slides.

It is a principal objective of the present invention to prevent fluid under pressure in a hydraulic actuator from leaking between two surfaces, one of which is movable relatively to the other, to a space of lower fluid pressure. It is a further objective to avoid using extra power under starting conditions to overcome static friction, a condition frequently referred to as "stiction." Such stiction can seriously impair the sensitivity of a hydraulic system actuating delicate instruments. In actuators in which the hydraulic cylinder is long in relation to its diameter, there may be insufficient stiffness in the unit to hold the piston at all times centrally within the cylinder. This may lead to scoring of the cylinder wall and thus to a loss of performance of the hydraulic actuator. It is a still further objective to improve the locating of a piston within a cylinder by preventing contact between these two members and thus to increasing the stiffness of the whole unit.

These and other objectives and advantages will be made clear in the following description in which a hydraulic actuator according to the invention is described by way of example with reference to the accompanying drawings in which:

FIGURE 1 is a longitudinal section through a hydraulic actuator for a machine tool slide, FIGURE 2 is a section along the line II—II of FIGURE 1, FIGURE 3 is a section along the line III—III of FIGURE 1.

Referring first to FIGURE 1, a shaft 1 is carried on two blocks 2 and 3 to both of which it is fixed against axial and rotary movement. Integral with the shaft 1 is a piston head 4 which is slidable within a cylindrical bore 5 of a machine tool slide 6. The bore 5 is converted into a double-acting cylinder by means of the piston head 4, two cylinder heads 7 and 8, and two ports 9 and 10, the cylinder heads 7 and 8 both being fixed to the slide 6 by studs which are not shown. The ports 9 and 10 are connected through a four-way selector 11 to a pressure pump 12 and to a tank 13.

The seal between the shaft 1 and the cylinder head 7 is formed by a pressure pipe 14 communicating through a three-way connector 15, and conduits 16 and 17 (see FIGURE 2) to three inlet conduits 18, 19 and 20, the inboard ends of which are enlarged to form cells 21, 22 and 23 respectively. The cells communicate with an annular space 24 formed by the clearance, approximately .001", between the shaft 1 and the cylinder head 7. Thus fluid at high pressure, approximately 1,000 p.s.i., contained in the pipe 14 flows to the cells 21, 22 and 23 through a restrictor of known design and not shown in either figure, the cells being equally spaced around the circumference of the shaft 1 (see FIGURE 2). Equally spaced between the cells 21, 22 and 23 are three grooves 25, 26 and 27, being directed in a direction parallel to the shaft axis and each communicating with two annular grooves 28 and 29 which are connected by means of a further axially directed outlet conduit 30 back to the tank 13. A narrow ring seal 31 is included in the cylinder head 7 between the cylinder and the annular groove 29.

The seal between the shaft 1 and the cylinder head 8 is formed in exactly the same way as that between the shaft and the cylinder head 7 hereinbefore described.

Four radial holes 32, 33, 34 and 35 (see FIGURE 3) are drilled in the piston head 4 and communicate with a bore 36 within the shaft 1. The peripheral ends of the holes 32, 33, 34 and 35 are enlarged and tapped at 37, 38, 39 and 40 respectively. Restrictors 41 are screwed into the enlargements 37, 38, 39 and 40 and comprise a plug with a capillary opening 42. Each enlargement 37, 38, 39 and 40 terminates in a cell cavity 43. Two annular grooves 44 and 45 are joined by four connecting channels 46. A bore 47 through the shaft 1 communicates with the annular groove 44 and is connected to a pipe 48 which returns to the tank 13. Narrow sealing rings 49 and 50 separate the annular grooves 44 and 45 respectively from the bore of the cylinder.

The apparatus operates in the following manner. The slide 6 is movable to the left and to the right as shown by a double-headed arrow in FIGURE 1, the movement resulting from opening one or other of the ports 9 or 10 to pressure from the pump 12. The selector 11 is arranged so that either side of the piston head 4 can be connected to pressure through one port whilst the other side through the other port is maintained at a lower pressure. If pressure is connected to the left hand side as viewed in FIGURE 1 through the port 9, that side of the cylinder is placed under a higher pressure with the other or right hand side. Since the shaft 1 and the piston head 4 are fixed, the pressure acts against the cylinder head 7 and the slide 6 starts to move to the left and continues to so move until the selector 11, which is automatically controlled by means not shown, moves to a fresh position and thereby alters the conditions actuating the cylinder.

Hydraulic fluid from a pressure source not shown is supplied to the pipe 14 through a resistor and is distributed through the inlet conduits 18, 19 and 20 to the three cells 21, 22 and 23 where the pressure is reduced to approximately one half of the supply pressure of 1,000 p.s.i. This pressure spread over each cell results in three forces acting radially inwards and each separated from its neighbour by 120°, thereby causing the shaft 1 to be centred within the annular space 24 and thus within the cylinder head 7. High pressure fluid from the cells leaks in an axial direction into the grooves 28 and 29 and in a circumferential direction to the axially disposed grooves 25, 26 and 27. Hence all fluid leaking from the cells enters the low pressure system and returns via the outlet conduit 30 to the tank 13.

High pressure fluid on the left of the piston 4 leaks past the ring seal 31 which acts as a primary barrier and enters the low pressure system through the circumferential groove 29 which thereby acts as an effective seal against the actuating fluid within the cylinder leaking to atmosphere.

Thus the hydrostatic arrangement between the cylinder head 7 and the shaft 1 not only prevents metal to metal contact, forming a bearing having a high degree of stiffness, but also forms a seal which effectively prevents the passage of high pressure fluid from within the cylinder to atmosphere.

Similarly hydraulic fluid at high pressure, 1000 p.s.i., is admitted to the bore 36, which constitutes an inlet passageway, and from thence through the holes 32, 33, 34 and 35, which constitute inlet conduits, and the restrictors 41 to the cell cavities 43. Since the cell cavities 43 are symmetrically spaced around its periphery, the piston 4 is held centrally within the cylinder wall 5 by the fluid pressure between the cell cavities 43 and the wall 5. The actual stiffness of the actuator system, i.e. the stiffness of the slide 6, depends on design features such as clearances and cell cavity sizes but can be made considerably greater than the stiffness of a system in which the piston is fitted with piston rings.

Fluid from the cell cavities 43 escapes in an axial direction along the clearance between the piston and the cylinder wall until it reaches the annular grooves 44 and 45. These grooves are interconnected and communicate through the bore 47, which constitutes an outlet passageway, and the pipe 48 with the tank 13. Thus the annular grooves 44 and 45 are maintained at a pressure slightly greater than atmospheric. The narrow sealing rings 49 and 50 help to prevent fluid movement between the actuating fluid in the cylinder and the hydrostatic fluid used to hold the piston 4 central.

What is claimed is:

1. A hydraulic actuator for a machine tool slide comprising a slide member having a cylindrical bore and two cylinder heads at opposite ends of a cylindrical space defined by said bore and said cylinder heads, a piston shaft arranged axially through said bore and through said cylinder heads, each of the cylinder heads having a conduit communicating with a space between the cylinder head and the piston shaft and through which fluid can be forced under pressure so as to provide a fluid bearing, a piston head on said piston shaft at a position between said cylinder heads and spaced therefrom so as to provide two chambers, each having one end wall formed by the piston head and another end wall formed by one of the cylinder heads, means to force fluid under pressure into one of the said chambers to exert a separating force between the piston head and the cylinder head forming the end walls of the chamber, and means to hold the piston shaft against axial movement so that said separating force causes axial movement of said slide member.

2. A hydraulic actuator for a machine tool slide as claimed in claim 1 wherein the piston shaft has a conduit communicating through the piston head with a space between the piston head and the slide member and through which fluid can be forced under pressure so as to provide a fluid bearing.

3. A hydraulic actuator for a machine tool slide comprising a slide member having a cylindrical bore and two cylinder heads at opposite ends of cylindrical space defined by said bore and said cylinder heads, a piston shaft arranged axially through said bore and through said cylinder heads, each of the cylinder heads having a plurality of inlet conduits leading to a corresponding plurality of cells formed between the cylinder head and the piston shaft and positioned in equi-spaced relationship around the periphery of the piston shaft, and further having an annular recess, with which the said cells communicate through a clearance space between the cylinder head and the piston shaft, and an outlet conduit which communicates with said annular recess so that fluid can be forced under pressure through said inlet conduits to said cells and can pass from said cells through said clearance space into said annular recess to said outlet conduit so as to provide a fluid bearing and to locate the piston shaft, a piston head on said piston shaft at a position between said cylinder heads and spaced therefrom so as to provide two chambers, each having one end wall formed by the piston head and another end wall formed by one of the cylinder heads, means to force fluid under pressure into one of the said chambers to exert a separating force between the piston head and the cylinder head forming the end walls of the chamber, and means to hold the piston shaft against axial movement so that said separating force causes axial movement of said slide member.

4. A hydraulic actuator for a machine tool as claimed in claim 3 wherein the piston shaft has an inlet passageway and an outlet passageway and the piston head has a plurality of inlet conduits which communicate with said inlet passageway and lead to a corresponding plurality of cell cavities equi-spaced around the periphery of the piston head and further has an annular groove, with which said cell cavities communicate through a clearance space between the piston head and said slide member, and which communicates through an outlet conduit with said outlet passageway, so that fluid can be forced under pressure through said inlet bore and said inlet conduits into said cell cavities and can flow from said cell cavities through said clearance space into said annular groove and through said outlet conduit to said outlet passageway so as to provide a fluid bearing and to locate the piston head.

References Cited by the Examiner

UNITED STATES PATENTS

| | | | |
|---|---|---|---|
| 1,647,425 | 11/27 | Wise | 92—112 |
| 2,295,160 | 9/42 | Christenson | 92—112 |
| 2,550,925 | 5/51 | Weimar | 92—117 |
| 2,689,626 | 9/54 | Peters | 308—5 |
| 2,710,234 | 6/55 | Hansen | 308—9 |
| 2,776,173 | 1/57 | Rudy | 308—5 |
| 2,998,999 | 9/61 | Morser et al. | 308—122 |
| 3,063,423 | 11/62 | Riordan | 92—112 |
| 3,076,523 | 2/63 | Fuller et al. | 308—122 |
| 3,109,514 | 11/63 | Deflandre | 308—5 |

RICHARD B. WILKINSON, *Primary Examiner.*